May 27, 1952 R. L. HALSTEAD 2,597,986
METHOD FOR MAKING CONTAINERS
Filed April 10, 1950 3 Sheets-Sheet 1
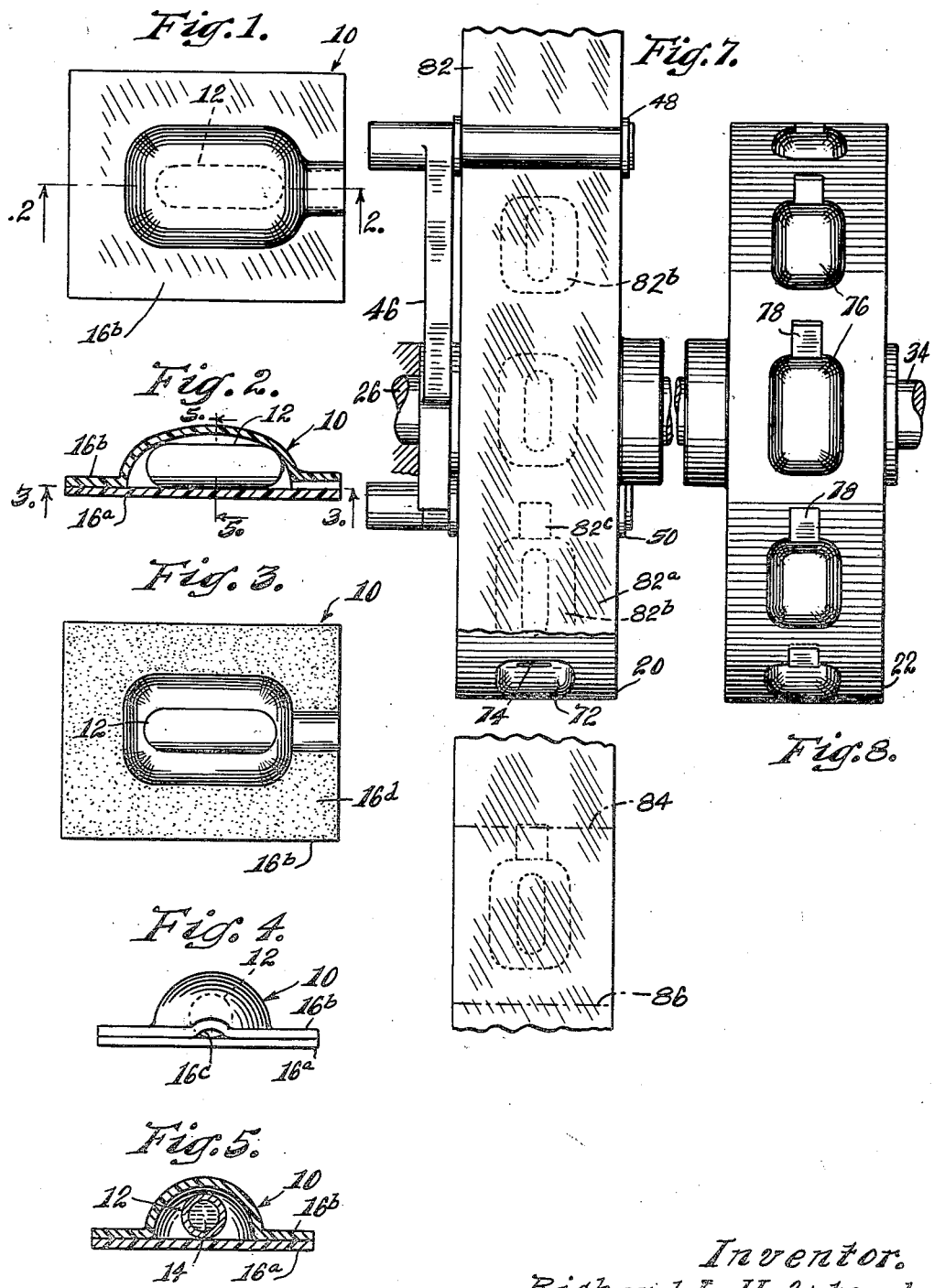
Inventor.
Richard L. Halstead.
By Bair, Freeman & Molinare
Att'ys.

May 27, 1952 — R. L. HALSTEAD — 2,597,986
METHOD FOR MAKING CONTAINERS
Filed April 10, 1950 — 3 Sheets-Sheet 2
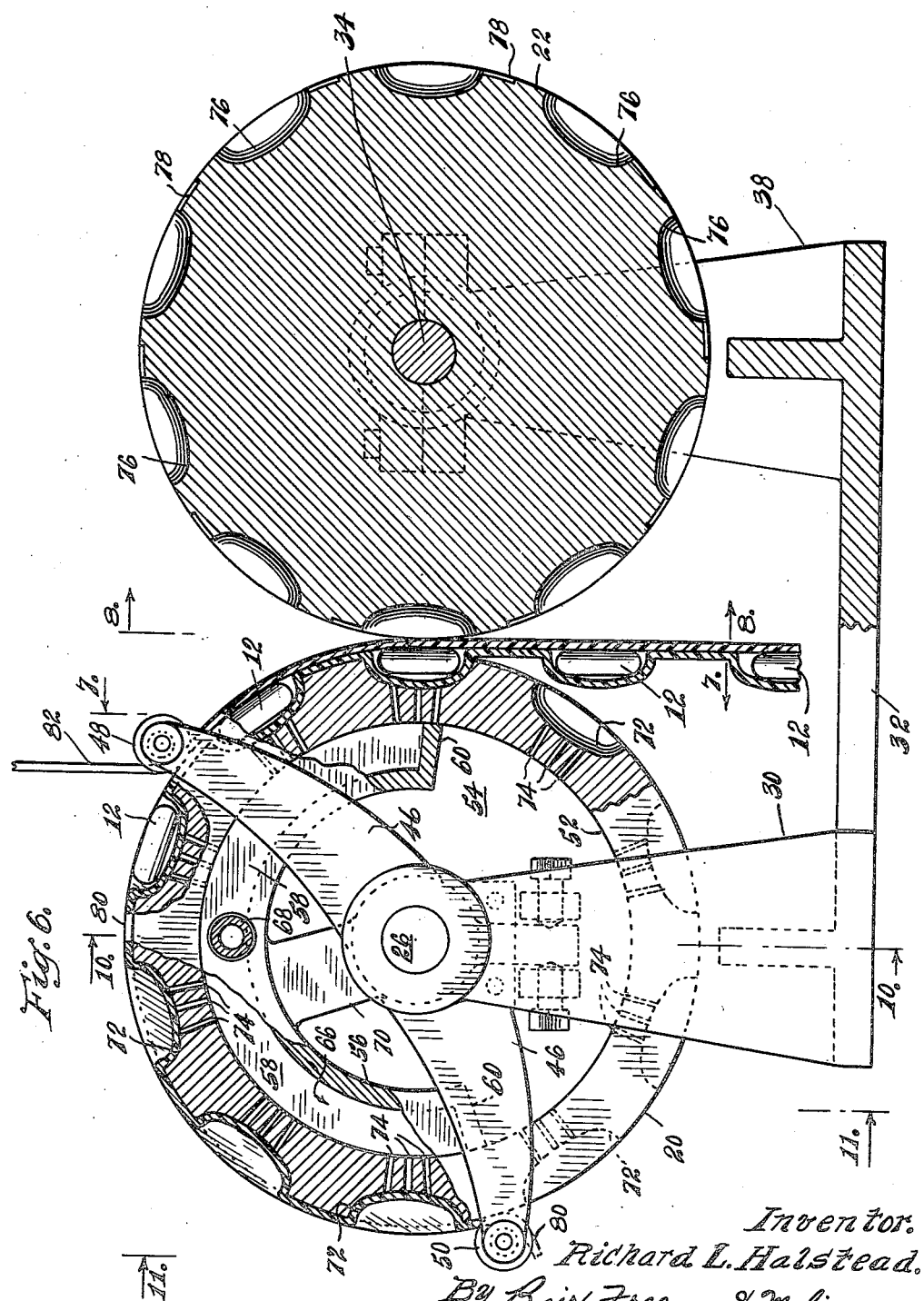
Inventor.
Richard L. Halstead.
By Bair, Freeman & Molinare
Attys.

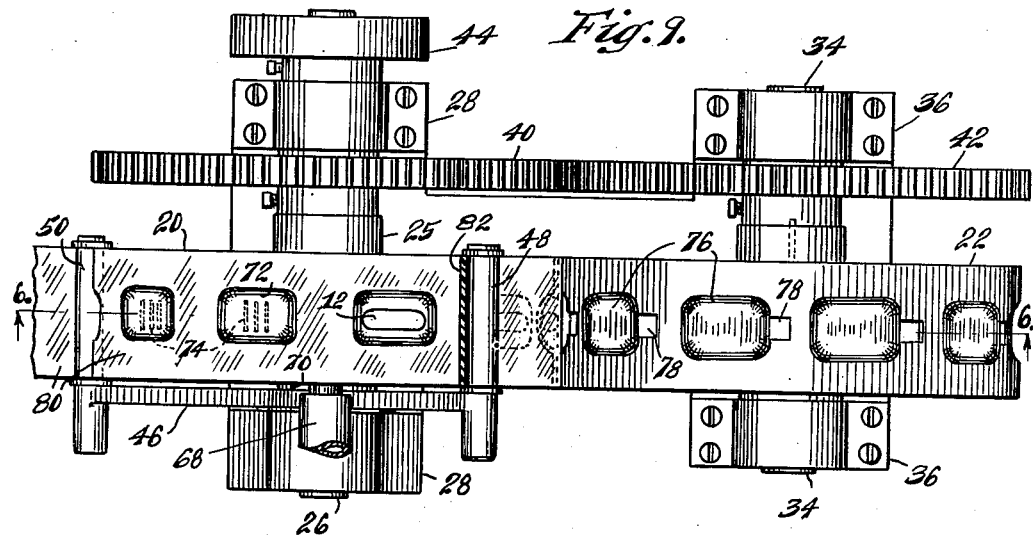
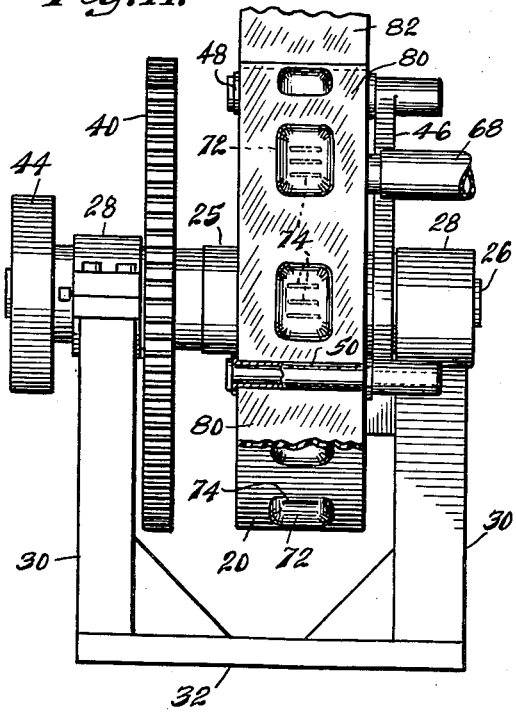
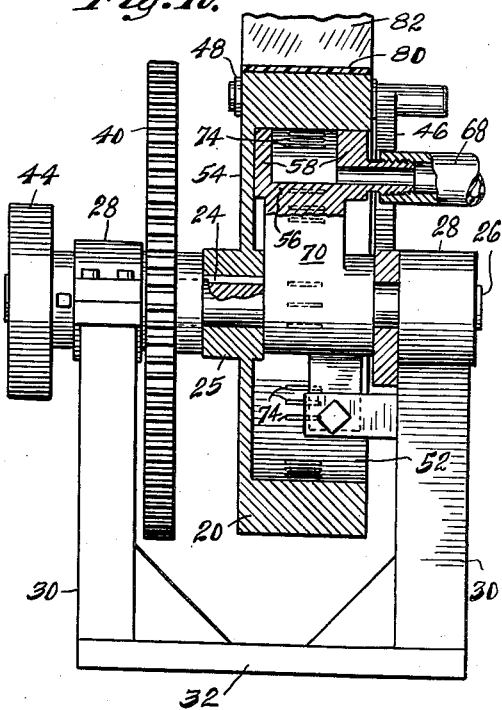

Patented May 27, 1952

2,597,986

UNITED STATES PATENT OFFICE 2,597,986

METHOD FOR MAKING CONTAINERS

Richard L. Halstead, Detroit, Mich., assignor to R. P. Scherer Corporation, Detroit, Mich., a corporation of Michigan Application April 10, 1950, Serial No. 155,072

3 Claims. (Cl. 18—86)

This invention relates to a method for making containers comprising a single fragile capsule made up of a material insoluble in water together with a flexible envelope enclosing said capsule and provided with a single dispensing aperture.

Reference is made to the copending application of Shelby Clyde McMillion, entitled "Envelope Containing Fragile Capsules," Serial No. 103,920, filed July 9, 1949. This copending application shows a container of the type indicated. A specific form of said container disclosed in the copending application is made up of a filled fragile capsule and two sheets of flexible material disposed one on each side of said capsule and having their opposed margins bonded together except over a small area defining a dispensing aperture.

It is an object of the present invention to provide a process for making the specific capsule above referred to by a method including the steps of providing a filled fragile capsule and flexible sheet material, disposing said capsule between two layers of said sheet material, bonding said two layers of sheet material together all around said capsule to define a sealed container having a chamber formed with a constricted end and cutting said two layers transversely and across said constriction to sever the resulting container from said sheet material and to define a dispensing aperture for said container.

Other and further objects and features of the present invention will become apparent from the following description and appended claims as illustrated by the accompanying drawings showing, by way of examples, a container according to said copending application and apparatus of the present invention for making said container. More particularly:

Figure 1 is a plan view of a container according to said copending application;

Figure 2 is a cross sectional view taken along the line 2—2 of Figure 1;

Figure 3 is a cross sectional view taken along the line 3—3 of Figure 2;

Figure 4 is an end elevation of the container of Figure 1;

Figure 5 is a cross sectional view taken along the line 5—5 of Figure 2;

Figure 6 is a fragmentary transverse vertical cross sectional view of apparatus for manufacturing the container of Figures 1 through 5 taken along the line 6—6 of Figure 9;

Figure 7 is a view taken along the line 7—7 of Figure 6;

Figure 8 is a view taken along the line 8—8 of Figure 6;

Figure 9 is a plan view of the apparatus of Figure 6;

Figure 10 is a cross sectional view taken along the line 10—10 of Figure 6; and

Figure 11 is an end elevational view taken along the line 11—11 of Figure 6.

The fragile capsules shown in the drawings in combination with flexible envelopes may be prepared by a method including an initial step involving a gelatin capsule making and filling operation carried out, for instance, according to the method of the patent to Robert P. Scherer, No. 1,970,396. The filled capsules are subsequently treated with formaldehyde.

By way of example, filled capsules may conveniently be prepared from a composition consisting essentially of 27.0% (by weight) of gelatin, 47.5% of glycerin and 25.5% of water. The filled capsules are thereafter tumbled with an emulsion of aqueous formaldehyde in oil; then tumbled with sponges to remove excess emulsion; and finally dried. More particularly, 20,000 capsules of 6½ minim capacity may be tumbled for 20 minutes with 200 grams of an emulsion containing 50% of formaldehyde of 37% strength, 30% of light mineral oil U. S. P. and 20% of anhydrous lanolin. In general, the emulsion should contain from 20 to 65%, and preferably about 50%, of aqueous formaldehyde of at least 10% strength and preferably of at least 35% strength. The ratio of gelatin to glycerin in the capsuule walls should range between 0.5 to 1.5. The time of tumbling as well as the amount of emulsion should be sufficient to insure uniform action of the formaldehyde solution on the capsules.

While specific reference has been made herein to gelatin capsules of reduced strength prepared by treatment with formaldehyde and subsequent drying, it should be understood that other fragile gelatin capsules or capsules made of other materials may also be used, in particular, when the material making up the capsule walls is more or less insoluble in water. In other words, any fragile capsules insoluble in water may be employed for the purposes of the present invention regardless of the chemical composition of the capsules.

In the drawings, the fragile capsules have been shown as filled with flowable material, for instance, a solution of a dye in an oil. Nevertheless, the capsules may be filled with other liquids, jellies, viscous preparations or the like, such as medicinal or cosmetic pastes, salves, creams or solutions or other liquids or granular or powdery material.

Referring now to Figures 1 through 5 of the drawings, a container according to said copending application is generally indicated by the reference numeral 10 and includes an inner fragile capsule 12 filled with solution 14 of a dyestuff in oil. The capsule is enclosed within an outer envelope made up of a lower sheet 16a and an upper sheet 16b sealed together at their edges except for an opening 16c. As shown, the marginal areas of the sheets 16a and 16b engage and are bonded together over the area indicated in Figure 3 at 16d by any suitable means, as by the application of heat and pressure, of a suitable adhesive or of an appropriate solvent.

Apparatus according to the present invention is shown in Figures 6 through 11 as including a hollow left rotatable cylinder 20 and a right rotatable cylinder 22. The cylinder 20 is rigidly fixed, as by means of a key 24 and a central hub 25, upon a shaft 26 journalled in bearings 28 supported on pedestals 30 projecting from a base 32. The right rotatable cylinder 22 is formed with stub shafts 34 journalled in bearings 36 supported on additional pedestals 38 projecting from the base 32. Gears 40 and 42 affixed, respectively, to shafts 26 and 38, effect rotation of the two rollers 20 and 22 at the same speed when the shaft 26 is rotated, as by force transmitted to a pulley 44 on the shaft 26 by a belt (not shown).

A stationary arm 46 extends diametrically across the cylinder 20 on the cylinder side away from the gear 40, being suitably apertured to permit free rotation of the shaft 26 and held against movement by attachment to a bearing 28, or otherwise. The arm 46 carries journalled in the ends thereof rollers 48 and 50 positioned, respectively, about 30° to 45° to the right of the top of the cylinder 20 and slightly below the extreme left side of the cylinder 20. Both rollers 48 and 50 are spaced from the surface of the cylinder 20 by a small distance, to admit tapes of plastic material into the resulting interspace, as explained hereinbelow.

Interiorly, the hollow cylinder 20 is formed with a cylindrical surface 52. One disc-shaped end wall 54 of the cylinder 20 is integral therewith and carries the hub 25. The other end of the cylinder 20 is open. A stationary arcuate member 56 extends within the cylinder 20 clockwise from a point aligned approximately diametrically with the roller 50 to the nip between the cylinders 20 and 22. In cross section, the arcuate member 56 is generally U-shaped, and the inner cylinder surface 52 slides over the ends of the legs 58 of the arcuate member. The ends of the arcuate member 56 are closed by transverse walls 60. Thus, the members 56 and the inner cylinder surface 52 together define a chamber 66 which is connected to a source of vacuum through a conduit 68. A support 70 extending from one pedestal 30 holds the arcuate member 56 in position.

The cylinder 20 is formed with a plurality of peripheral recesses or molding cavities 72 each communicating with the interior of the cylinder 20 through one or more small conduits 74. The cylinder 22 is formed with peripheral recesses or cavities 76 adapted to register with the cavities 72 in the cylinder 20 when the two cylinders are rotated in opposite directions. However, each cavity 76 is extended at one end, as at 78, beyond the corresponding end of the opposed cavity 74.

The above described apparatus functions as follows: A band 80 of plastic material is caused to travel under the roller 50 over the surface of the cylinder 20. Vacuum is supplied to the chamber 66 through the conduit 68. The vacuum pulls the band 80 into the molding cavities 72. As the band 80 passes clockwise beyond the uppermost part of the cylinder 20, a capsule 12 is deposited in each molding cavity. Next, a band 82 of plastic material moving under the roller 48 is superposed over the band 80. Past the roller 48 the two bands 80 and 82 travel in surface-contact with the capsules 12 held therebetween within the cavities 72. As the two bands travel through the nip between the two counter-rotating cylinders 20 and 22, the opposing surfaces of the two plastic bands or strips 80 and 82 are sealed together over their whole areas of contact. Sealing is not effected over the areas overlying the cavities 72 and 76 and the extensions 78 of the cavities 76. As shown in Figure 7, the sealed area indicated at 82a completely encloses the capsule 12 within an elongated space 82b having an upper extension indicated at 82c. The resulting continuous strip or band is then cut transversely along the dot-dash lines 84 and 86 extending, respectively, across the sealed space extension 82c and outside the other end of the sealed space 82a. Thus, in the article of Figures 1 through 5, the aperture 16c is formed by the above disclosed cutting across the extension 82c of the sealed space 82b, the other end of the article 12 being completely sealed.

The bands 80 and 82 may consist of gelatin in plastic condition, of natural or synthetic elastomers, of unsaturated polyesters or of polyethylene and the like. As indicated, these bands or strips may be rendered plastic by heat, by the application of a suitable solvent or adhesive or by any other suitable means.

Many details of construction may be varied within a wide range without departing from the principles of this invention and it is, therefore, not my purpose to limit the patent granted on this invention otherwise than necessitated by the scope of the appended claims.

I claim:

1. A method for making a container comprising a filled fragile capsule and two sheets of flexible material disposed one at each side of said capsule and having their opposed margins bonded together except over a small area defining a dispensing aperture, said method comprising providing a filled fragile capsule and flexible sheet material, disposing said capsule between two bands of said sheet material, bonding said two bands of said sheet material together all around said capsule to define a sealed space around said capsule, said space being formed with a constricted end extending lengthwise of said bonded-together bands, and subsequently cutting said two bands along a transverse line extending across said constriction to sever the resulting container from said bands and to define a dispensing aperture for said container.

2. A method for making a container comprising a filled fragile capsule and two sheets of flexible material disposed one at each side of said capsule and having their opposed margins bonded together except over a small area defining a dispensing aperture, said method comprising providing a filled fragile capsule and two bands of flexible sheet material, forming a pocket in one of said bands, disposing said capsule in said pocket, superposing the other band over said pocket, bonding said two bands of said sheet material together all around said capsule to define a sealed space around said capsule, said space being formed with a constricted end extending lengthwise of said bonded-together bands, and subsequently cutting said two bands along a transverse line, extending across said constriction to sever the resulting container from said bands and to define a dispensing aperture for said container.

3. A method for making a container comprising a filled capsule having fragile walls and two sheets of fragile material disposed one at each side of said capsule and having their opposed margins bonded together except over a small area defining a permanently open dispensing aperture, said method comprising providing a filled capsule having fragile walls and two bands of fragile sheet material, forming a pocket in one of said bands, disposing said capsule in said pocket, superposing the other band lengthwise of said first band to cover said pocket, bonding said two bands of sheet material together all around said capsule to define a sealed space around said capsule, said space being formed with a constricted end extending generally lengthwise of said bonded-together bands, and subsequently cutting said bands along a line extending from one side of said extension to the other side thereof to sever the resulting container from said bands and to define a permanently open dispensing aperture for said container.

RICHARD L. HALSTEAD.

REFERENCES CITED

The following references are of record in the file of this patent:

UNITED STATES PATENTS

| Number | Name | Date |
|---|---|---|
| 1,481,866 | Heist | Jan. 29, 1924 |
| 2,141,318 | Salfisberg | Dec. 27, 1938 |
| 2,397,051 | Scherer | Mar. 19, 1946 |
| 2,486,758 | Pfeiffer | Nov. 1, 1949 |
| 2,490,781 | Cloud | Dec. 13, 1949 |
| 2,497,212 | Donofrio | Feb. 14, 1950 |
| 2,518,565 | Nicolle | Aug. 15, 1950 |